(12) United States Patent
Lion et al.

(10) Patent No.: US 8,203,107 B2
(45) Date of Patent: Jun. 19, 2012

(54) MICROWAVABLE COOKING IMPLEMENTS AND METHODS FOR CRISPING FOOD ITEMS USING THE SAME

(75) Inventors: Mathieu Lion, Paris (FR); Elodie Brisset, Paris (FR)

(73) Assignee: Mastrad, S.A., Paris (FR)

( * ) Notice: Subject to any disclaimer, the term of this patent is extended or adjusted under 35 U.S.C. 154(b) by 0 days.

(21) Appl. No.: 13/176,719

(22) Filed: Jul. 5, 2011

(65) Prior Publication Data

US 2011/0250325 A1    Oct. 13, 2011

Related U.S. Application Data

(63) Continuation-in-part of application No. 12/984,557, filed on Jan. 4, 2011, which is a continuation-in-part of application No. 11/157,747, filed on Jun. 21, 2005, now Pat. No. 7,861,886, which is a continuation of application No. 10/883,348, filed on Jul. 1, 2004, now Pat. No. 7,850,035.

(51) Int. Cl.
     *H05B 6/80*          (2006.01)

(52) U.S. Cl. ............... 219/725; 426/523; 220/573.1

(58) Field of Classification Search ............... 219/725, 219/759, 686, 730, 732; 426/242, 243, 523, 426/637, 804, 441, 302, 119, 102; 99/107, 99/422, 426; 220/771, 772; 524/588
See application file for complete search history.

(56) References Cited

U.S. PATENT DOCUMENTS

| | | | |
|---|---|---|---|
| 2,182,454 A | 8/1937 | Sherman | |
| 2,201,968 A | 5/1940 | Fischer | |
| 2,411,857 A | 12/1946 | Harriss | |
| 2,960,218 A | 11/1960 | Cheeley | |
| 3,278,074 A | 10/1966 | Masaru | |
| 3,804,965 A * | 4/1974 | Peters | 426/523 |
| 3,804,967 A | 4/1974 | Peters | 426/523 |
| 3,844,525 A | 10/1974 | Parmett | |
| 3,941,968 A | 3/1976 | MacMaster et al. | 219/10.55 E |
| 3,949,658 A | 4/1976 | Morrison et al. | 99/341 |
| 3,962,961 A | 6/1976 | Peters | 99/426 |
| 4,080,884 A | 3/1978 | Terrell | |
| 4,165,855 A | 8/1979 | Mason, Jr. | |
| 4,191,517 A | 3/1980 | Byrd et al. | |
| 4,565,468 A | 1/1986 | Crawford | 405/270 |
| 4,705,929 A | 11/1987 | Atkinson | 219/10.55 E |
| 4,960,211 A | 10/1990 | Bailey | 211/60.1 |
| 4,965,424 A | 10/1990 | Bagley | |
| 5,010,805 A | 4/1991 | Ferrara | 99/353 |
| 5,166,485 A | 11/1992 | Arai et al. | |
| 5,209,957 A | 5/1993 | Lin | 428/34.7 |
| 5,232,609 A | 8/1993 | Badinier et al. | 249/102 |
| 5,298,707 A | 3/1994 | Sprecher et al. | |

(Continued)

FOREIGN PATENT DOCUMENTS

CH        443870        9/1967

(Continued)

*Primary Examiner* — Quang Van
(74) *Attorney, Agent, or Firm* — Connolly Bove Lodge & Hutz LLP

(57) ABSTRACT

A cooking implement having a resilient cooking surface made of silicone and maintained at tension. The cooking surface includes a plurality of holes and a support device having a curved periphery disposed about the periphery of the cooking surface to stretch and maintain the cooking surface at tension. The support device is configured to support the cooking surface at a distance above a ground surface.

4 Claims, 6 Drawing Sheets

U.S. PATENT DOCUMENTS

| | | | |
|---|---|---|---|
| 5,300,747 A | 4/1994 | Simon | |
| 5,389,768 A | 2/1995 | Sarnoff et al. | 219/732 |
| 5,432,324 A | 7/1995 | Freewald | 219/731 |
| 5,463,794 A | 11/1995 | Erland | |
| 5,503,062 A | 4/1996 | Buff, IV | 99/426 |
| 5,601,012 A | 2/1997 | Ellner | 99/428 |
| 5,676,989 A | 10/1997 | Durance et al. | |
| 5,730,310 A | 3/1998 | Yoshihara | |
| 5,843,544 A | 12/1998 | Andersen et al. | |
| 5,968,577 A | 10/1999 | Roecker | 426/523 |
| 6,067,698 A | 5/2000 | Silvera-Langley | 29/428 |
| D32,414 S | 10/2000 | Simpson et al. | D9/418 |
| 6,279,771 B1 | 8/2001 | Bryant | 220/573.1 |
| 6,371,012 B2 | 4/2002 | Sawyer | 99/450 |
| 6,700,106 B2 | 3/2004 | Cochran et al. | |
| 6,722,522 B2 | 4/2004 | Bryant et al. | 220/573.1 |
| 6,733,852 B2 | 5/2004 | Littlejohn et al. | |
| 6,976,597 B2 | 12/2005 | Jahrling et al. | 211/175 |
| 6,994,225 B2 | 2/2006 | Hakim | |
| 7,011,014 B2 | 3/2006 | Siegel | 99/422 |
| 7,032,773 B2 | 4/2006 | Dees et al. | |
| 7,105,193 B2 | 9/2006 | Yeung | |
| 7,150,221 B2 | 12/2006 | Morgan | 99/428 |
| D541,584 S | 5/2007 | Lorbach | D7/352 |
| 7,419,071 B2 | 9/2008 | Lion | 220/771 |
| 7,517,933 B2 | 4/2009 | Holmes et al. | |
| 2001/0004056 A1 | 6/2001 | Sawyer | |
| 2001/0043977 A1 | 11/2001 | Llorente Hompanera | 426/523 |
| 2002/0088807 A1 | 7/2002 | Perkovic et al. | |
| 2002/0100372 A1 | 8/2002 | Bryant et al. | |
| 2002/0171027 A1 | 11/2002 | Martellato et al. | |
| 2003/0039727 A1 | 2/2003 | Crocker | 426/241 |
| 2003/0071188 A1 | 4/2003 | Bruno | |
| 2003/0089718 A1 | 5/2003 | Zinnbauer | |
| 2003/0192847 A1 | 10/2003 | Jahrling et al. | |
| 2004/0231527 A1 | 11/2004 | Brasset | |
| 2004/0234653 A1 | 11/2004 | Cogley et al. | |
| 2004/0249059 A1* | 12/2004 | Akbar et al. | 524/588 |
| 2005/0000960 A1 | 1/2005 | Bergeret | |
| 2005/0034604 A1 | 2/2005 | Halliday et al. | |
| 2005/0056642 A1 | 3/2005 | Lion et al. | |
| 2005/0082286 A1 | 4/2005 | Nikkhah | 220/9.1 |
| 2005/0199132 A1 | 9/2005 | Meeks et al. | 99/426 |
| 2006/0000368 A1 | 1/2006 | Lion et al. | |
| 2006/0083833 A1 | 4/2006 | Pezzana et al. | |
| 2007/0080163 A1 | 4/2007 | Yeung | |
| 2007/0267374 A1 | 11/2007 | Middleton et al. | |
| 2008/0083751 A1 | 4/2008 | Berryhill et al. | 219/730 |
| 2008/0314897 A1 | 12/2008 | Lion | |

FOREIGN PATENT DOCUMENTS

| | | |
|---|---|---|
| DE | 8107871 | 10/1981 |
| DE | 003832524 | 3/1990 |
| DE | 19646695 | 5/1997 |
| DE | 19847186 | 7/1999 |
| DE | 19922439 | 5/2000 |
| DE | 10258644 | 6/2004 |
| EP | 000278055 | 8/1988 |
| EP | 0992195 | 4/2000 |
| EP | 1132000 | 9/2001 |
| EP | 1197149 | 4/2002 |
| EP | 1972242 | 6/2010 |
| FR | 1590193 | 4/1970 |
| FR | 2437590 | 4/1980 |
| FR | 2493812 | 5/1982 |
| FR | 2747885 | 10/1997 |
| FR | 2747886 | 10/1997 |
| FR | 2768494 | 3/1999 |
| FR | 2773605 | 7/1999 |
| FR | 2786667 | 9/2000 |
| FR | 2786668 | 9/2000 |
| FR | 2822934 | 10/2002 |
| FR | 2827494 | 1/2003 |
| GB | 1159021 | 7/1969 |
| GB | 002154860 | 9/1985 |
| GB | 9623118 | 1/1997 |
| IT | 8125460 | 12/1981 |
| JP | 2002264548 | 9/2002 |
| JP | 2004360980 | 12/2004 |
| JP | 2007307427 | 11/2007 |
| JP | 2008178691 | 8/2008 |
| KR | 20100007570U | 7/2010 |
| WO | WO 96/28978 | 9/1996 |
| WO | WO 98/02045 | 1/1998 |
| WO | WO 03/078012 | 9/2003 |

\* cited by examiner

MICROWAVABLE COOKING IMPLEMENTS AND METHODS FOR CRISPING FOOD ITEMS USING THE SAME

CROSS-REFERENCE TO RELATED APPLICATIONS

This application is a continuation-in-part of U.S. patent application Ser. No. 12/984,557, filed Jan. 4, 2011, which is a continuation-in-part of U.S. patent application Ser. No. 11/157,747, filed Jun. 21, 2005, now U.S. Pat. No. 7,861,886, issued on Jan. 4, 2011, which is a continuation of U.S. patent application Ser. No. 10/883,348, filed Jul. 1, 2004, now U.S. Pat. No. 7,850,035, issued on Dec. 14, 2010. The contents of each of the foregoing applications are incorporated herein by reference in their entireties.

FIELD OF THE INVENTION

The present disclosure relates to cooking implements and, more particularly, to a cooking implement having a cooking surface that is particularly suited for crisping food items cooked using microwave energy.

BACKGROUND

Potato chips are among the most popular snack food. Unfortunately, most potato chips are cooked by deep frying in oil, as the deep frying process gives the potato chips its characteristic light-and-crispy texture. During the deep frying, the potato chips are subjected to a rapid rate of heating at high temperatures, which rapidly boils water out of the potato chip pores to produce a puffed and expanded tissue structure within the potato chips. It is this puffed and expanded structure that gives the potato chips its desired light-and-crispy texture. Because the deep-frying process also results in the inevitable uptake of the cooking oil by the potato chips, potato chips are often high in fat content. As a result, many seek to limit or avoid consumption of potato chips for health reasons.

One alternative to deep frying potato chips is to bake them. Baking, however, typically requires the use of oil to coat the cooking surface so as to prevent the potato chips from sticking to the pan or other cooking surface. Moreover, because the baking process is a significantly longer process than deep-frying, it does not rapidly drive the water out of the potato chip tissue pores as in deep frying. Thus, baked potato chips are typically denser in texture than deep-fried potato chips.

Another alternative to deep frying potato chips is to cook them in a microwave oven. Microwave energy cooks food differently from deep-frying or baking. Both the deep-frying and baking processes provide a high temperature atmosphere that impinges on the surface of the food, thereby cooking food from the outside in. Moisture is driven from the exterior of the food first and the heat transfer takes place from the periphery to the center of the food product.

In contrast, microwave ovens typically cook food from the inside out. This is because microwave cooking of foods is accomplished by high intensity, high frequency electromagnetic radiation that penetrates into the food product. Heating occurs when the food absorbs the electromagnetic energy and moisture is transferred from the interior to the exterior of the product due to the evaporation of free water contained therein. As a result, the middle of the food is typically heated before its surface.

One significant disadvantage of microwave cooking of foods is that it does not typically brown or provide a crispy texture to foods, as is often desired. Microwave cooking is typically perceived as producing soggy and unappealing texture. Thus, the conventional wisdom has been to apply an additional heat source to the exterior of food items cooked in a microwave oven to produce the desired browning or crisping of the food items.

To that end, susceptor materials have been developed and used as a cooking surface to brown and crisp food items, such as pizza dough and French fries. A susceptor is typically a thin film made of metallized film, ceramics or metals that absorbs and interacts with microwave energy to produce heat. Among the first microwave susceptors marketed were those from the 1980s in a product called McCain Micro Chips, which provided a susceptor sheet as a cooking surface for cooking French fries in a microwave oven.

One problem with susceptor materials, however, is that the amount of heat generated by the susceptor material surface cannot be readily controlled, thus resulting in burning of the food items placed thereon. Moreover, a layer of oil is required to cook items such as potato slices on susceptor material to prevent sticking. The burning and adhesion of delicate or thinly-sliced food items is particularly problematic, as the burning and adhesion of the food items to the susceptor cooking surface irreparably compromises them and makes them entirely unsuitable for consumption.

BRIEF SUMMARY

The present disclosure provides a cooking implement that may be used to cook and crisp a variety of foods in a microwave, without the use of oils or other non-stick coating on the cooking surface. The cooking implement is particularly suited to rapidly cook and crisp delicate or thinly-sliced food items, such as potato chips, in a microwave oven. Due to the rapid heating action, potato chips cooked on the cooking implement have the light-and-crispy texture that is characteristic of deep-fried potato chip, without the attendant uptake in oil of the deep-frying process. Moreover, the cooking implement provides a cooking surface upon which potato chips may be cooked without burning or sticking. Because oils retain and conduct heat, it is optionally preferred to avoid the use of oils during the microwave process so as to prevent the overcooking and burning of thinly-sliced food items.

The cooking implement departs from the conventional wisdom that a susceptor or other external heat source is required for crisping food items cooked in a microwave oven. It has been surprisingly found that potato chips may be optimally crisped by using microwave-transparent materials as a cooking surface, instead of susceptors, which are absorb microwaves. In fact, susceptors have been found to be entirely unsuitable for cooking or crisping potato chips for consumption, as they have typically resulted in burning and thus are generally not suited to producing potato chips of adequate appearance, texture or quality.

Moreover, cooking implement permits efficient heat transfer by providing a cooking surface of relatively thin material and having a plurality of holes to permit the release of water contained from the food items placed thereon. Silicone material has superior release characteristics which prevent foods from sticking thereon. This is particularly advantageous for thinly-sliced food items, such as fruit and potato chips, which typically require delicate handling.

The configuration of the cooking implement additionally provides for a pattern of air circulation that allows food items of a wide range of sizes, shapes and dimensions to attain a desirably crispy texture when cooked. A support system is provided such that air circulation is provided on both sides of the cooking surface. A plurality of holes may be provided to further increase air circulation and thus allow for the food thereon to be cooked and even crisped.

In one embodiment, a cooking implement for crisping food items in a microwave oven is provided. The cooking implement comprises a cooking surface made of a thermally-resistant material of high tensile strength. The cooking surface comprising a plurality of holes. A support device is disposed about the periphery of the cooking surface and supports the cooking surface above the ground. This permits air circulation both above and below the cooking surface. Moreover, the cooking surface is stretched and maintained at tension about the support device.

In accordance with a first separate aspect of the preferred embodiment, the cooking surface is made of silicone.

In accordance with a second separate aspect of the preferred embodiment, the silicone cooking surface has a thickness of between 0.5 mm and 2.0 mm.

In accordance with a third separate aspect of the preferred embodiment, the cooking surface is stretched so as to remain substantially flat.

In accordance with a fourth separate aspect of the preferred embodiment, the support device is disposed below the cooking surface and is made of thermally-resistant material.

In another preferred embodiment, a cooking implement for crisping food items in a microwave oven is provided. The cooking implement comprises a resilient elastomeric membrane comprising a top cooking surface having a plurality of holes, a peripheral gripping portion coupled to the top cooking surface, and a frame having a peripheral edge. The top cooking surface contacts the food items and has a non-stick surface, the top cooking surface being made of a thermally-resistant material that is substantially transparent to microwave energy. The peripheral gripping portion engages the peripheral edge of the frame to stretch the top cooking surface across the frame and to maintain the top cooking surface at sufficient tension to support a weight of food items placed thereupon without substantial vertical deformation. The top cooking surface is maintained at a distance above the ground to allow an unobstructed circulating air space underneath the top cooking surface. A circulating airspace is permitted on both sides of the top cooking surface and through the plurality of holes.

In accordance with a first separate aspect of the preferred embodiment, the resilient elastomeric membrane, including the top cooking surface, is made of silicone.

In accordance with a second separate aspect of the preferred embodiment, the top cooking surface has low to no electrical or thermal conductivity.

In accordance with a third separate aspect of the preferred embodiment, the frame is made of a material that is substantially transparent to microwave energy, such as polypropylene.

In accordance with a fourth separate aspect of the preferred embodiment, the thickness of the cooking surface is about 2 mm or less. The top cooking surface may be maintained at sufficient tension to support a weight of food items placed thereupon of about 0.1 to 2 kg/cm$^2$.

In accordance with a fifth separate aspect of the preferred embodiment, the distance that the top cooking surface is maintained above the ground is about 0.5 cm to about 5 cm.

In accordance with a sixth separate aspect of the preferred embodiment, the cooking implement may comprise a plurality of spaced apart legs disposed underneath the top surface to facilitate air circulation underneath the top surface. The plurality of legs may each be substantially perpendicular to a plane defined by the top cooking surface. Alternatively, the top cooking surface and the plurality of legs may define an angle that is substantially less than 90 degrees to permit stacking additional ones of the cooking implements on top of one another.

In a further preferred embodiment, a method of crisping food items is provided. The method comprises placing a layer of a food item on top of the top cooking surface of the cooking implement and crisping the food item by heating the food item with a single step of exposing the food item to microwave energy for a predetermined period of time. The method preferably does not include the application of oil or other non-stick material or ingredient to the cooking surface of the food items.

In accordance with a first separate aspect of the preferred embodiment, the food items are uncooked potato slices having a thickness of about 5 mm or less.

In accordance with a second separate aspect of the preferred embodiment, a single layer of uncooked potato slices is placed on the top cooking surface.

In accordance with a third separate aspect of the preferred embodiment, the heating is performed by a microwave at 600 to 1500 watts for 10 seconds to 12 minutes.

Other objects, features and advantages of the present invention will become apparent to those skilled in the art from the following detailed description.

BRIEF DESCRIPTION OF THE DRAWINGS

Illustrative embodiments of the present invention are described herein with reference to the accompanying drawings, in which.

Like numerals refer to like parts throughout the several views of the drawings.

DETAILED DESCRIPTION OF THE PREFERRED EMBODIMENTS

Figure 1:
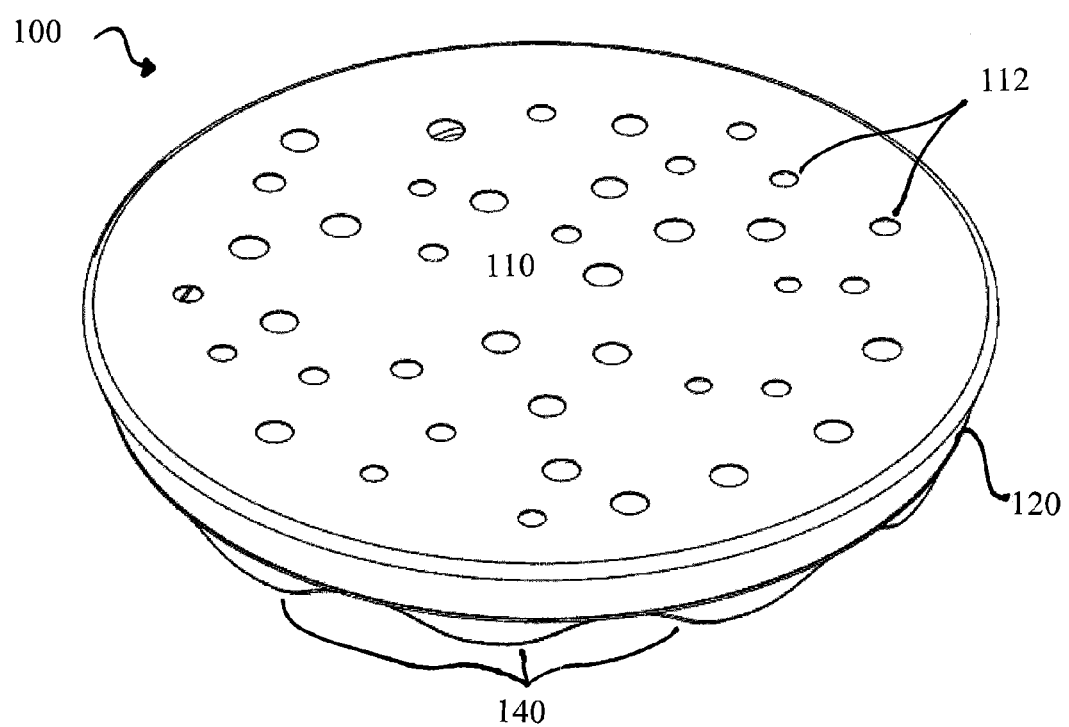
FIG. 1 is a perspective view of one embodiment of the microwavable cooking implement.

Reference is now made to FIGS. 1-6 which illustrate a non-limiting preferred embodiment of the cooking implement 100.

The cooking implement 100 is depicted as generally comprises a resilient elastomeric membrane comprising at least a top cooking surface 110, a peripheral gripping portion 120 coupled to the top cooking surface 110 and a frame 130 having a peripheral edge.

The top cooking surface 110 is preferably made of thermally-resistant material that is substantially transparent to microwave energy. The significance of this feature is the top cooking surface 110 will not retain or conduct substantial heat, if any, so that the food item is substantially cooked or dried by the action of the microwave energy alone and not by the application of external heat supplied by the top cooking surface 110. In a preferred embodiment, the top cooking surface 110 is made of a material has low to no electrical or thermal conductivity. In a particularly preferred embodiment the top cooking surface 110 is made of silicone material.

The top cooking surface 110 is also preferably made of a non-stick material so as to obviate the need to use cooking oils or other layer of ingredients between the top cooking surface and the food items to prevent food items from sticking on the top cooking surface. Another advantage to eliminating the use of oils is that the food items may be prepared which are significantly lower in fat content than in the conventional deep-frying or baking process. Silicone is particularly preferred for its non-stick and release characteristics for nearly all food items. While a number of different materials may be transparent to microwave energy, such materials may not be suitable for use in connection with crisping thinly-sliced food due to problems with adhesions of food to the material. For example, while polypropylene is a material that is substantially transparent to microwave energy, it is not suitable for a top cooking surface as adhesion of food to polypropylene may occur when the food is cooked in the microwave. Therefore, in addition to being substantially transparent, it is preferable that the top cooking surface 110 is non-stick and has release characteristics that is at least as good as food-grade silicone.

The thickness of the top cooking surface 110 is also preferably selected so as to optimize the crisping of the food items placed thereon. The thinner the top cooking surface 110, the less it interferes with the microwave energy intended for the food item. The thickness of the top cooking surface 110 is preferably not too thick so that it is difficult or slow to heat up during the initial cooking process. Also, the thickness of the top cooking surface 110 is not too thin to present a likelihood of failure or overheating. In a preferred embodiment, the top cooking surface has a thickness of 2 mm or less, preferably 1.5 mm or less, preferably from about 0.5 mm to about 2 mm, and most preferably from about 0.3 mm to about 1.1 mm, in the unstretched state.

The peripheral gripping portion 120 of the top cooking surface 110 engages the peripheral edge of the frame 130 to stretch the top cooking surface across the frame 130 and to maintain the top cooking surface 110 at sufficient tension to support a weight of food items placed thereupon without substantial vertical deformation.

The peripheral gripping portion 120 may be made of a resilient elastomeric membrane material that is the same as, and therefore integral with the top cooking surface 110. Alternatively, the peripheral gripping portion 120 may be separate from the top cooking surface 110 and made of the same or a different material as the top cooking surface. The peripheral gripping portion 120 may thus be attached directly or indirectly to the top cooking surface 110. The peripheral gripping portion 120 is disposed at an angle relative to the plane defined by the top cooking surface 110. The angle is selected so as to optimally engage the surface of the peripheral edge of the frame 130.

In a preferred embodiment, the top cooking surface 110 is maintained at sufficient tension to support a weight of food items placed thereupon of about 0.1 to 2 kg/cm². The thicker the top cooking surface 110, the greater the tension applied to it. Thus, for lighter food items, the cooking implement 100 may have a relatively thin top cooking surface 110 that is stretched at a relatively lower tension across the frame 130, whereas for heavier food items, the cooking implement 100 may have a relatively thicker top cooking surface 110 that is stretched at a relatively higher tension across the frame 130.

The frame 130 is preferably made of a material that is substantially transparent to microwave energy, but it need not be non-stick. Since food does not contact the frame 130, it is not critical for the frame to also be made of non-stick material. Thus, in a preferred embodiment, the frame 130 may be made any material that is substantially transparent to microwave energy, such as silicone or polypropylene.

In a particularly preferred embodiment, the peripheral edge of the frame 130 is substantially circular in shape so that the tension across the top cooking surface is imparted radially about the center of the top cooking surface 110. One advantage of having tension applied radially across the top cooking surface 110 is that it allows for a more uniform thickness of the stretched top cooking surface 110 and thus more even cooking of the food items disposed thereon.

The engagement of the peripheral gripping portion 120 and the peripheral edge of the frame 130 may be via friction alone or may be enhanced with an adhesive applied therebetween. In a preferred embodiment, the peripheral gripping portion 120 and the peripheral edge of the frame 130 are coupled via friction. To that end, the peripheral gripping portion 120 may be configured to have a dimension that roughly corresponds with the dimension of the peripheral edge of the frame 130. In order to enhance the friction fit of the two surfaces, as shown in the embodiment shown in FIGS. 4 and 5, the diameter of the peripheral gripping portion 120 may be slightly smaller than the peripheral edge of the frame 130. Additionally, the peripheral gripping portion 120 may have an angle relative to the plane defined by the top cooking surface 110 that is less than the angle defined by the peripheral edge of the frame 130 with reference to the same plane.

The pattern of air circulation provided by the cooking implement 100 also allows for the crisping of the food items in the microwave oven. The top cooking surface 110 is maintained at a distance above the ground to allow an unobstructed circulating airspace A underneath the top cooking surface 110. Thus, a circulating airspace is permitted on both sides of the top cooking surface 110 and through the plurality of holes 112. In a preferred embodiment, the top cooking surface 110 is maintained at a distance above ground surface or level that is about 0.5 cm to about 5 cm. The ground surface or level is defined by reference to the plane at which the supports or at least two of the plurality of legs 140 contacts a surface.

Figure 2:
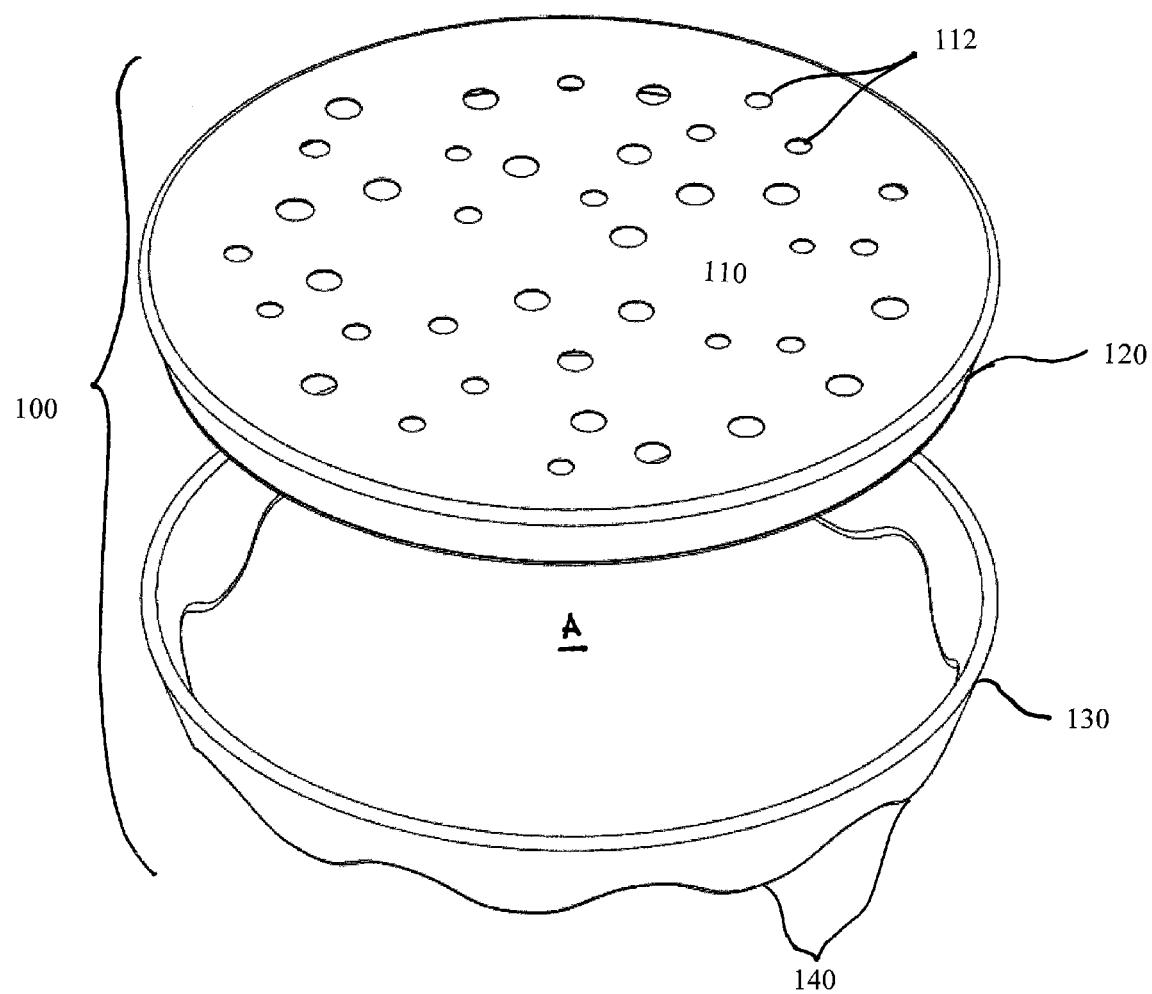
FIG. 2 is an exploded perspective view of the microwavable cooking implement of FIG. 1.
Figure 3:
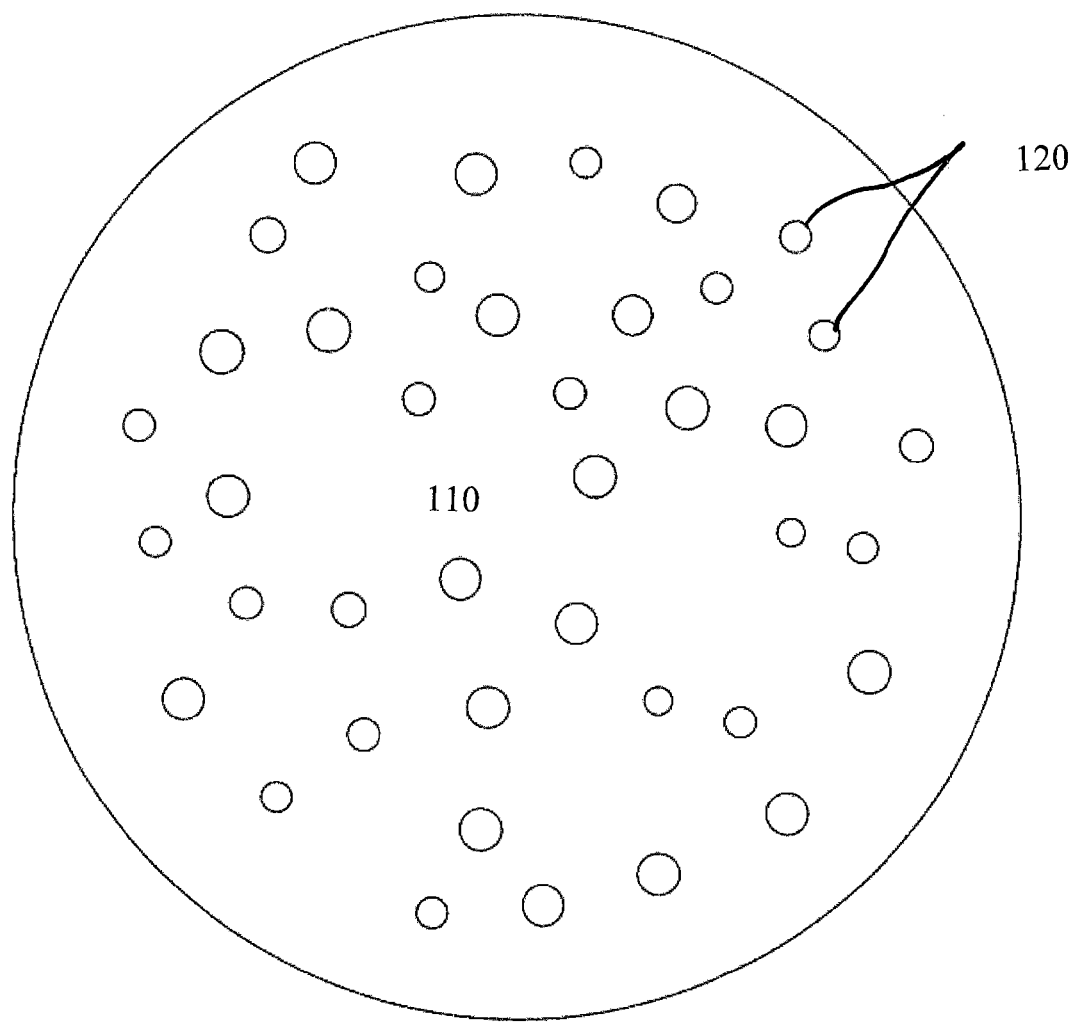
FIG. 3 is a top elevational view of the microwavable cooking implement of FIG. 1.
Figure 4:
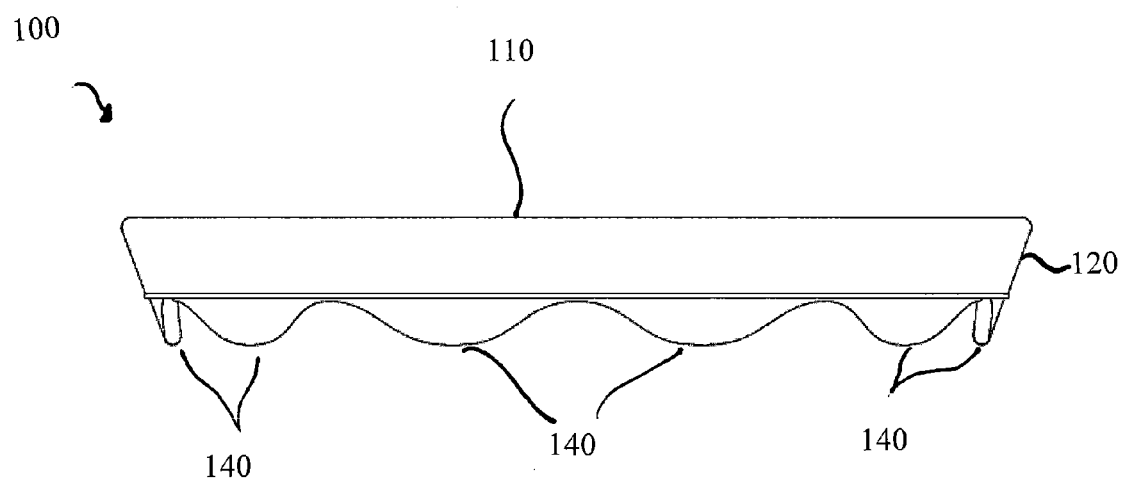
FIG. 4 is a side view of the microwavable cooking implement of FIG. 1.
Figure 5:
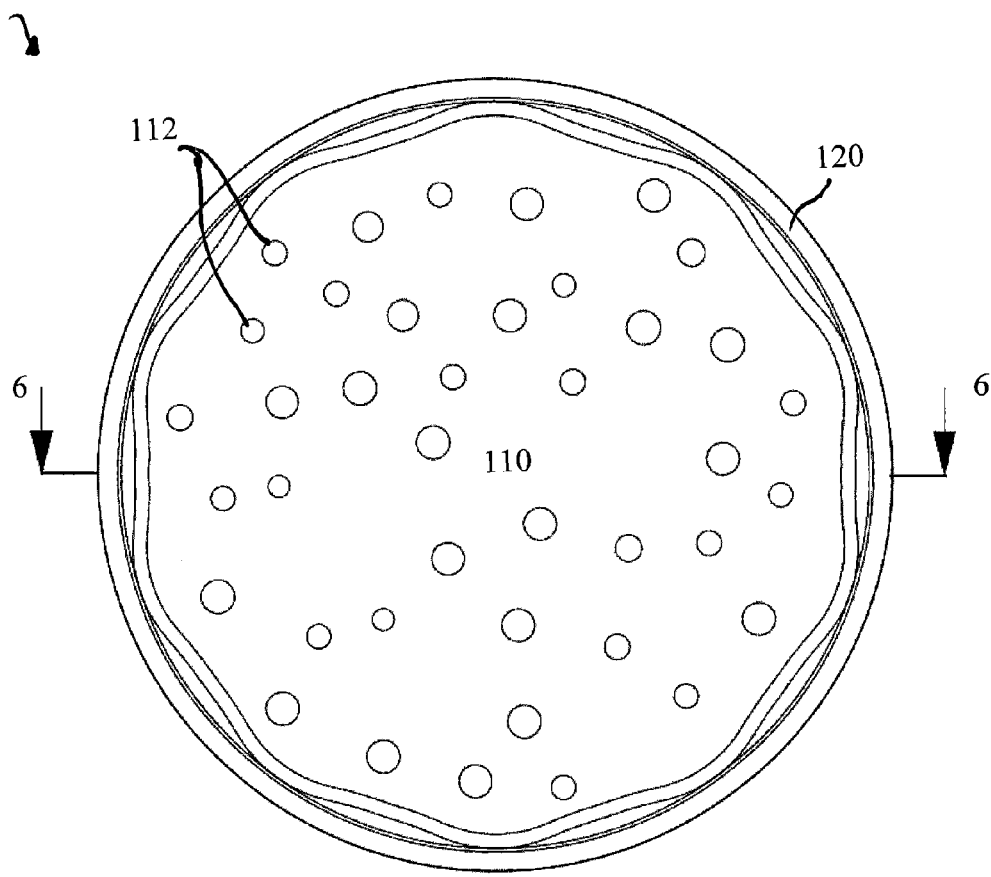
FIG. 5 is a bottom view of the microwavable cooking implement of FIG. 1.
Figure 6:
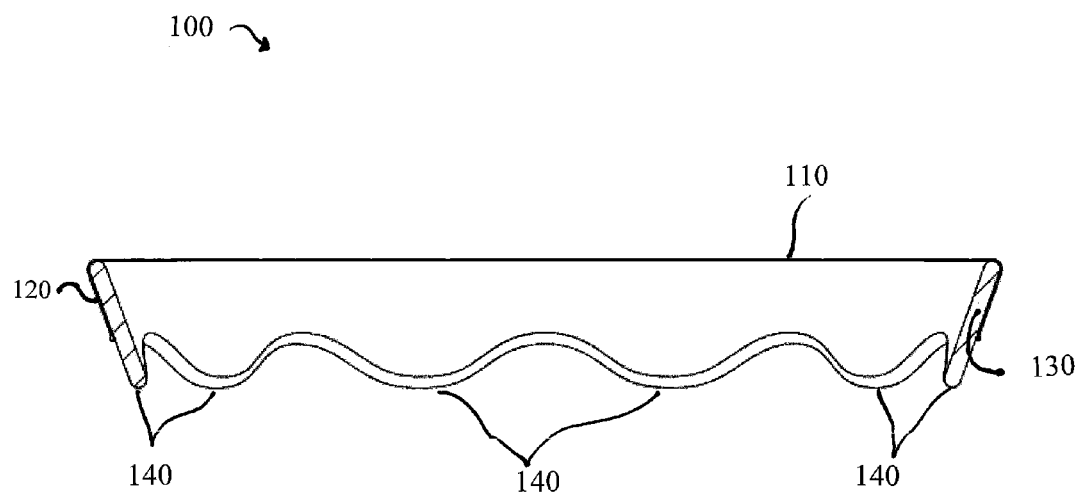
FIG. 6 is a cross-sectional view of the microwavable cooking implement along the axis 6-6 as shown in FIG. 5.

As shown in FIG. 2, an unobstructed air space A is provided underneath the top cooking surface 110. In a preferred embodiment, there are no intervening structures in the area designated A, which is between the ground surface and the underside of the top cooking surface 110. Thus, air is allowed to freely circulate both above and below the top cooking surface 110 and also through the plurality of apertures 112. Additionally, air is further allow to freely circulate below the top cooking surface 110 through the plurality of legs 140 which are disposed underneath the top surface.

The holes or apertures 112 are configured so as to optimize heating and air circulation about the food items. As the food items placed on top of the top cooking surface 110 are exposed to microwave energy, water contained in the food items is quickly evaporated or driven off from the food. Thus, the plurality of holes 112 allow for the escape of moisture from the underside of the food placed thereon. In a preferred embodiment, the food item is placed on a portion of the top cooking surface 110 that includes at least one, if not a few, holes 112. The frequency and the sizes of the holes are controlled so as to allow an optimal ratio of the area of the exposed to covered food item. If too much of the food item is exposed, it may result in overdrying; if too little of the food item is exposed, the food item may not be sufficiently crisped due to insufficient drying.

A plurality of cooking implements 100 may be stacked on top of one another in order to increase the quantity of food items cooked in a single microwavable cycle. To that end, the plurality of legs 140 may be disposed at an angle that is less than 90 degrees relative to the plane defined by the top cooking surface 110 (See FIG. 4) to permit additional ones of the cooking implements on top of one another. In a preferred embodiment, the plurality of legs 140 are disposed at an angle of from about 60 to 85 degrees and, more preferably, from about 70 to 85 degrees.

Example 1

Potato chips using the microwavable cooking implement. A microwavable cooking implement as depicted in the drawings was used. The microwavable cooking implement had a top cooking surface made of silicone and a plurality of holes disposed thereon.

A potato was thinly sliced (between 1-2 mm in thickness) using a mandolin. The potato slices were arranged in a single layer on top of the cooking surface. Each potato slice was arranged on top of a portion of the cooking surface having at least one hole to ensure proper air circulation for drying during cooking. Moreover, the potato slices were placed directly on top of the cooking surface, without use of cooking oil or other ingredient between the potato slices and the cooking surface.

The microwavable cooking implement having the single layer of potato slices placed thereon were placed inside a 1000 watt microwave oven and cooked on high for 3 minutes.

Comparative Example 2

Potato chips using a susceptor tray. A susceptor tray was created by placing a susceptor sheet on top of a paperboard box and providing holes were through both the susceptor surface and the paperboard box surface and also through the peripheral side walls to allow for air circulation.

A potato was thinly sliced (between 1-2 mm in thickness) using a mandolin. The potato slices were arranged in a single layer on top of the susceptor tray. Each potato slice was arranged on top of a portion of the susceptor tray having at least one hole to ensure proper air circulation for during cooking. Moreover, the potato slices were placed directly on top of the susceptor tray, without use of cooking oil or other ingredient between the potato slices and the susceptor tray.

The susceptor tray having the single layer of potato slices placed thereon were placed inside a 1000 watt microwave oven and cooked on high for 3 minutes.

The table below compares the results of the potato chips produced from the microwavable cooking implement and the susceptor tray.

| Sample | Appearance | Texture | Ease of Removal |
| --- | --- | --- | --- |
| Example 1 | Tan to pale brown portions | Light and crispy | Very easy to remove; potato slices did not stick to the cooking surface |
| Comparative Example 2 | Significant areas with burnt, blackened portions | Brittle | Very difficult to remove due to sticking of potato slices. |

Because the silicone of the top cooking surface does not absorb significant microwave energy, it allows the microwave energy to react first with the chips without the production or conduction of significant heat by the silicone cooking surface. This allows the potato chips to dry and crisp, without burning. Moreover, the delicate potato chips are easily removable from the silicone cooking surface.

In contrast, the susceptor tray allows interacts with the microwave energy and produces and conducts heat. The potato slices are therefore cooked both by heat conduction from the susceptor tray and microwave energy, which results in the burning of the potato slices. Thus, the susceptor tray is undesirable for use in cooking thinly-sliced or delicate food items. Not only do the potato chips cooked thereon become burned, blackened and brittle, they cannot be removed from the susceptor tray due to sticking of the burnt portions thereon.

It is to be understood that the detailed description and specific examples, while indicating preferred embodiments of the present invention, are given by way of illustration and not limitation. Many changes and modifications within the scope of the present invention may be made without departing from the spirit thereof, and the invention includes all such modifications.

What is claimed is:

1. A cooking implement for crisping sliced food items comprising:
   a resilient cooking surface made of silicone and maintained at tension, the cooking surface comprising a plurality of openings therethrough; and
   a support device having a peripheral edge engaging at least a portion of the peripheral gripping portion surrounding the cooking surface, the support device exerting a stretching and a tension across the cooking surface such that the cooking surface remains flat the support device supporting the cooking surface at a distance above a ground surface.

2. The cooking implement of claim 1, wherein the cooking surface is made solely of silicone.

3. The cooking implement of claim 1, wherein the silicone cooking surface has a thickness of between 0.5 mm and 2.0 mm.

4. The cooking implement of claim 1, wherein the support device is disposed below the cooking surface and is made of thermally-resistant material.

* * * * *